M. C. NIXON.

BALING PRESS.

APPLICATION FILED AUG. 5, 1913.

Reissued Sept. 9, 1913.

13,615.

2 SHEETS—SHEET 1.

Witnesses

E. M. Sparenberg

R. A. Putman.

Inventor

Moses C. Nixon

COLUMBIA PLANOGRAPH CO., WASHINGTON, D. C.

M. C. NIXON.
BALING PRESS.
APPLICATION FILED AUG. 5, 1913.
Reissued Sept. 9, 1913.
13,615.
2 SHEETS—SHEET 2.
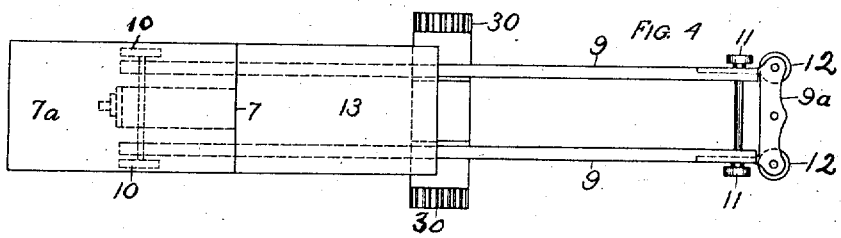
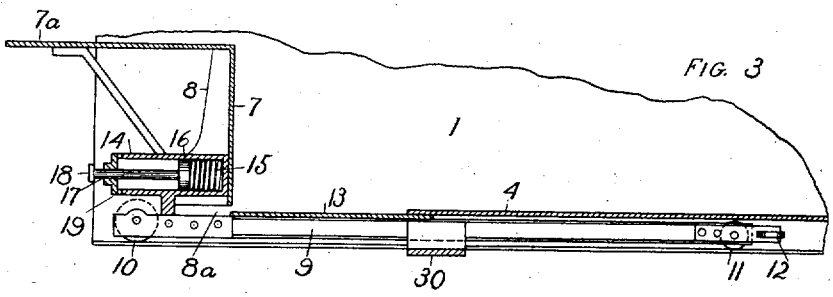
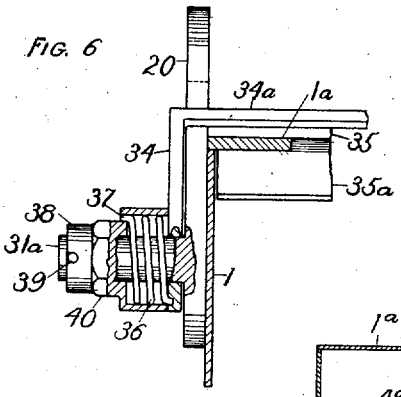
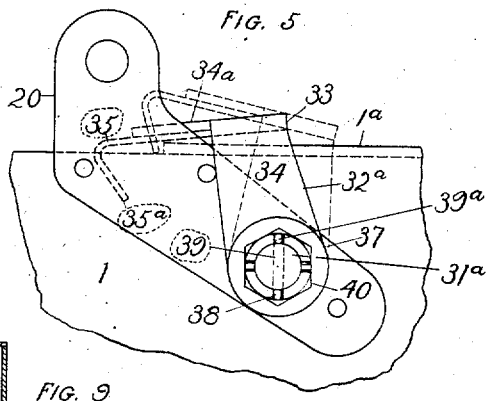
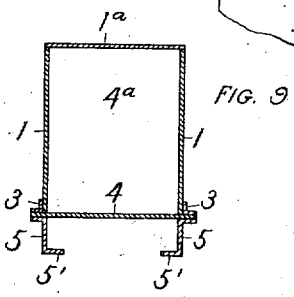
Witnesses
C. M. Sparenberg
R. A. Putman.
Inventor
Moses C. Nixon
COLUMBIA PLANOGRAPH CO., WASHINGTON, D. C.

UNITED STATES PATENT OFFICE.

MOSES C. NIXON, OF PERU, INDIANA.

BALING-PRESS.

13,615. Specification of Reissued Letters Patent. Reissued Sept. 9, 1913.

Original No. 1,043,345, dated November 5, 1912, Serial No. 608,974. Application for reissue filed August 5, 1913. Serial No. 783,041.

*To all whom it may concern:*

Be it known that I, MOSES C. NIXON, a citizen of the United States, residing at Peru, in the county of Miami and State of Indiana, have invented certain new and useful Improvements in Baling-Presses, of which the following is a specification.

This invention relates to baling-presses and more particularly to that type in which the plunger is actuated by a pull connection as distinguished from the type in which the plunger is operated by a push bar, the objects being to provide a construction whereby a direct operating pull connection can be had between the power and plunger, and the bale delivered toward the power; to provide a cushioning means to neutralize the shock caused by the rebound of the plunger; to provide a simple and efficient feeder to automatically force the material down into the press-chamber; and to provide means for tucking in the loose ends of the material which project when the plunger is retracted; and consists, preferably, in the construction hereinafter described, which may be varied without departing from the spirit of my invention.

Figure 2:
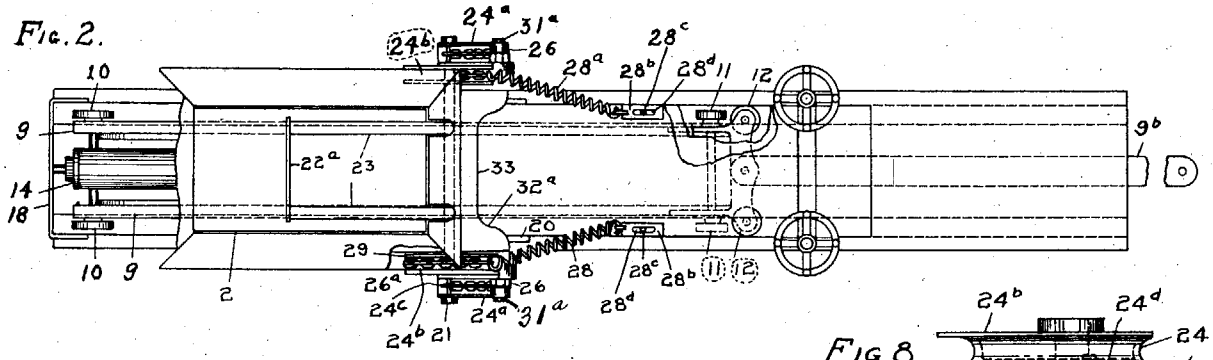
Figure 8:
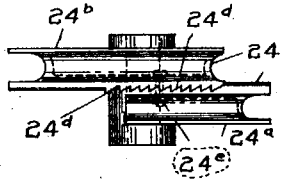
Figure 7:
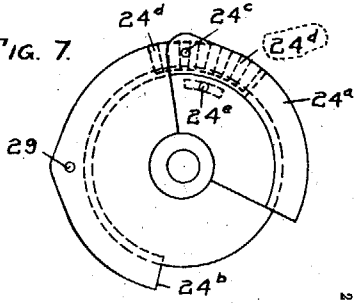
Figure 1:
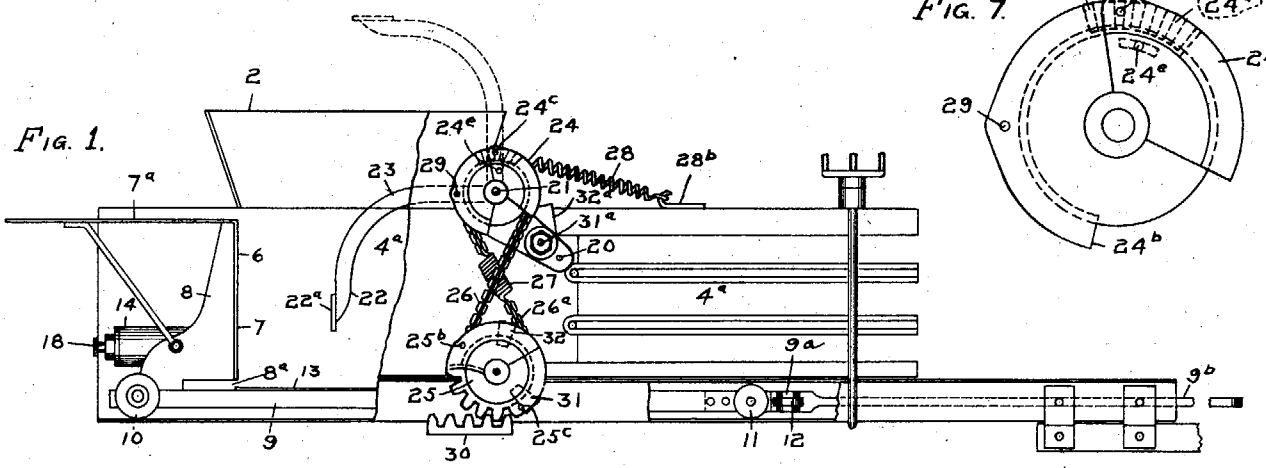

Figure 1 is a side elevation of a baling-press, parts being broken away to better show the interior construction; Fig. 2 is a plan view of the same, also parts broken away; Fig. 3 is a longitudinal sectional view of plunger, air cushion and a part of bale-chamber; Fig. 4 is a plan view of the plunger; Fig. 5, a side view of the tucker; Fig. 6, a view of a part of tucker with parts broken away showing tension mechanism; Fig. 7, a side elevation of the upper sheave of the feeder mechanism; Fig. 8, a plan view of Fig. 7, and Fig. 9, a sectional end view of the baling-case and chamber.

Referring to the drawings, similar numerals of reference indicate corresponding parts in the different views, and, referring to the same, the baling-case is formed with the usual sides 1, top $1^a$ and feed opening 2. An angle bar 3 (Fig. 9) is fixed to and extends along the outer lower portion of each side 1. The bottom of the baling-case is formed of a stationary portion or member 4 and a movable portion or member 13. Member 4 is secured to angle bars 3 and extends longitudinally from a suitable point within the baling-chamber $4^a$, to any suitable distance toward the front or power end of the machine. Beneath bottom 4 are two Z bars 5, the upper flange of each of which turns outwardly and the lower flange turns inwardly. The outwardly extending flange of each Z bar is secured to bottom 4 and to angle bar 3, and the inner face of each web of Z bars 5 and the inner faces of sides 1 are in vertical alinement.

Plunger 6, comprises the front plate 7 and top plate $7^a$ which are secured to supports 8, the supports being mounted on two beams 9, preferably I beams, which are suitably secured together. Beams 9 are provided near their ends with rollers 10 and 11 which are adapted to run on the inwardly projecting flanges 5′ of Z bars 5. The forward ends of beams 9 are also provided with laterally mounted anti-friction rollers 12, which roll against the inner face of Z bars 5. A plate 13 is secured to the top of beams 9 and its width is practically equal to the distance between Z bars 5, but with sufficient clearance to permit a free reciprocating movement between the same. Z bars 5, beams 9 and rollers 10 and 11 are so proportioned as to permit beams 9 and plate 13 to pass beneath stationary bottom 4 of the baling-chamber as they move forward and back on flange 5′ of Z bars 5.

It is apparent that the distance which bottom 4 shall extend rearwardly is governed by the extreme forward movement of the plunger. Plate 13 must be of sufficient length to extend from plate 7, when plunger is in retracted position, to a point a short distance underneath the rear end of bottom 4 in order to furnish a bottom for the baling-chamber between the plunger and end of bottom 4. Plate 13 thus forms the movable portion or member of the bottom of the baling-case.

In drawings (Figs. 1 and 3) is shown a lateral recess $8^a$ in supports 8, beneath the lower edge of plate 7, of such dimensions as to permit the entrance of bottom 4 when the plunger is drawn forward to the maximum distance. It is not essential, however, to construct the plunger with this recess $8^a$ as plate 7 may extend downwardly to plate 13. In such case, bottom 4 will be shortened at its rear end a sufficient amount to permit the plunger to advance its full stroke or maximum distance. Plate 13 would also be lengthened to close the gap between plate 7 and bottom 4, thus occasioned, when the plunger is in its retracted position.

At the forward end of beams 9 is a cross piece $9^a$ to which is attached pull bar $9^b$, the forward end of bar $9^b$ is adapted to be connected with the power mechanism. The power by which the press may be operated is not shown in the drawings as it may be connected with and driven by any motive power.

Attached to the plunger, as on the rear side of plate 7, is fixed a cylinder 14 having therein a spring 15 and a piston 16. The piston rod 17, which is attached to piston 16, extends rearwardly from the cylinder and is adapted to strike plate or strap 18, which is secured to the baling-case or frame. Suitable openings 19 in cylinder 14 at the rear of piston provide communication between the interior of that cylinder and the outside. It is apparent that as the plunger rebounds, upon the release of the power pressure thereon, it travels very rapidly rearward. When piston rod 17 strikes end plate or strap 18, piston 16 is thereby driven forward and compresses the air in front of it which takes up or cushions the momentum of the plunger and thereby relieves the shock and jar to the mechanism which would occur except for this cushion. Spring 15 is also compressed by this forward movement of the piston 16 and when plunger 6 moves forward again this spring forces the piston outwardly into its normal position for the next rebound of the plunger. It is apparent that the position of the cylinder 14 could be reversed; that is, fixed to the end plate or strap 18, or other suitable stationary part, with the piston rod 17 extending forwardly therefrom and arranged so it would be struck by the plunger 6 as it rebounds rearwardly with the same result. The operation of the device is identical in either position. On each side of the baling-case and adjacent to the feed opening 2, is fixed a bracket 20. These brackets support a shaft 21 which carries feeder 22. This feeder comprises arms 23 which are attached to and extend from shaft 21 and connected at their outer end by plate $22^a$.

Any form of feeder will suffice for my purpose, such apparatus being old in the art. Feeder 22 is adapted to be raised and lowered through feed-opening 2 for the purpose of forcing the material being baled down into the baling-chamber. Motion is imparted to feeder 22 in the following manner: Shaft 21 carries a double sheave 24, preferably, on each of its ends, which ends project beyond the sides of the baling case. These double sheaves each comprise an outer portion $24^a$ and an inner portion $24^b$. These two portions are provided with matching serrations $24^d$ and the two portions are secured together in an adjusted position of the two serrations relative to each other by bolt $24^e$, which bolt passes through suitable openings in the two portions, one of the openings being a slot to provide adjustment of the two portions. This adjustment of the two portions of sheave 24 is provided in order to regulate the limit of the downward movement of the feeder. A similar double sheave 25 is provided on the exterior of the lower portion of each side of the baling-case and in vertical alinement with the sheave above it. A chain 26 or other suitable means is attached at one of its ends to the outer portion of sheave 24, as by pin $24^c$, and passes forwardly over that member, the lower end thereof being attached to the rear face of the outer portion of sheave 25, as by pin $25^b$. Another chain $26^a$, having a spring or other tension portion 27 therein, is attached at its lower end to the forward face of the inner portion of sheave 25, as by pin $25^c$, and is carried upwardly and over the rear face of sheave 24, the upper end being connected to the rear end of tension spring 28, the other end of said spring 28 is attached to the baling-case, as by hook $28^b$ and bolt $28^c$, having adjustment in slot $28^d$, or other suitable manner. Both the chain $26^a$ and spring 28 are also attached to the inner portion of sheave 24 in a suitable manner as by pin 29. A similar system of connections is provided between the double sheaves on the opposite side of the baling-case. Lower sheaves 25 are provided with a number of teeth thus forming segment gears which may be bevel or spur gears and which are adapted to mesh with racks 30, or other suitable means adapted to rock said gears, said racks being preferably secured to beams 9 of plunger 6. As plunger 6 moves forwardly racks 30 mesh with segment gears of sheaves 25, and rock these gears and sheaves toward the rear of the machine producing a pull on the chains 26 which causes sheaves 24 to rock in the opposite direction. This rocking of sheaves 24 also rocks shaft 21 forwardly which thereby elevates feeder 22 to the position shown in dotted lines in Fig. 1. On the rebound or retraction of plunger 6 to its normal position the segment gears and sheaves 25 will be rocked forwardly by racks 30, which rocking, through the connecting chains $26^a$, produces a rearward motion to sheaves 24 and shaft 21, by which feeder 22 is lowered into the baling chamber. Springs 28 and $28^a$ are thereby extended and the tension thus produced on said springs tends to pull the feeder up and hold it in normal position until the rebound or retraction of the plunger brings it down again. These springs could be of sufficient strength to raise the feeder without the use of the elevating feature of the double sheave, but it is preferred to make the elevation of the feeder positive by the use of the double sheaves and chain arrangement. On the inside of lower sheave 25 is a lug 31 which is adapted to come in contact with a stationary mating lug 32 on the side of the baling-case, by which contact the upward movement of the feeder 22 is limited, the springs 28 and 28[a] holding the feeder in the raised position as fixed by the contact of said lugs. These lugs are so positioned on their respective surfaces that, when they are in contact, the segment gears of sheaves 25 will be in position to mesh with racks 30, as the plunger moves rearwardly. Springs 27 in chains 26[a] are intended as a safety device to relieve the parts from any shock or excessive strain that may occur in case the feeder 22 should meet with any abnormal resistance as it descends into the baling chamber.

While members 24 and 25 are described as sheaves, it is understood, of course, that any suitable form of pivoted member will suffice, the purpose being to produce an efficient mechanism for operating a feeder of what is termed a "pull power" press, that is, where the plunger moves toward the power end of the machine while pressing the charge, my intention being to transform the motion of the reciprocating parts of the device into a rocking movement for the feeder.

Extending laterally from each bracket 20 is a pivot 31[a] on which is pivotally mounted a tucker 32[a], which comprises a yoke or bracket 33 having two depending members or arms 34 each provided with an opening in the lower extremity by which the yoke or bracket is adapted to be pivotally supported on pivots 31[a]. Yoke or bracket 33 is of sufficient height to clear the top of the baling-case 1[a] and the upper portion 34[a] of it is projected rearwardly toward feed opening 2. This upper portion carries a plate 35 the rear part of which is bent downward and forwardly to form the tucker blade 35[a] which extends transversely across the forward end of the feed opening 2. In normal position blade 35[a] extends downwardly and forwardly a short distance into the baling chamber 4[a]. The pivots 31[a] are arranged at a point forward of and below the plane of the lower edge of blade 35[a] so that as the plunger advances forcing the material forward the action of the latter against the sloping blade 35[a] forces or rolls it forwardly and upwardly in a circle about its pivots while the material passes under it, then when the plunger has retracted rearwardly the tucker is restored to its normal position by means illustrated in Figs. 5 and 6. It consists of a torsion spring 36 which encircles pivot 31[a], one end of which is engaged in an opening in arm 34 of the tucker. The other end of the spring is engaged in an opening provided in housing 37 which incloses the spring 36 and extends outwardly along pivot 31[a]. The outer end of housing 37 is reduced and provided with a number of openings or notches 38. Pivot 31[a] is provided with a hole 39 in such position that pin 39[a] may be inserted into it, which pin will also engage one of the notches 38. The notches might be arranged so that pin 39[a] could engage diametrically opposite notches. Housing 37 may be provided with plane surfaces 40 to which a wrench may be applied to turn the housing about the pivot, thereby increasing or decreasing the tension of spring 36 as desired. When the desired tension is given spring 36 pin 39[a] is then inserted in hole 39 and engaged in notches 38, by which the housing is held to the pivot in adjusted position.

It will be noticed that the tendencies of torsion springs 36 is to force tucker 32[a] to its normal and lowest position within the baling chamber; the tension on those springs must, therefore, be sufficient not only to force down the tucker but also to force down with it the loose ends of material which project from the compressed mass after the plunger has retracted to the rear, so that on the next compression those loose ends will be folded down and caught within the bale. Since the motion of tucker 32[a] is downward and rearward its effect is ideal in forcing down loose material, for a tucker having that motion gathers in the loose material and effectually works it down for later compression and assures the production of a smooth bale.

What I claim is:

1. A baling-press comprising a baling-chamber, a plunger having a base frame movably supported below the chamber, said base frame carrying a bottom extending transversely approximately the width of the chamber and adapted to pass beneath the stationary part of the bottom of said chamber.

2. A baling-press comprising a baling-chamber provided with a fixed bottom, a reciprocating plunger therein having a base frame carried on rollers and supporting a bottom extending transversely approximately the width of the chamber and adapted to reciprocate beneath said fixed bottom.

3. A baling-press comprising a baling-chamber, a plunger adapted to reciprocate within the chamber, a portion of the bottom which extends transversely approximately the width of the chamber being movably supported by and adapted to reciprocate with the plunger.

4. A baling-press comprising a baling-case and a baling-chamber formed thereby and provided with a transversely continuous bottom extending across the width of the case, a plunger arranged to reciprocate within the chamber and carrying a movable section of the bottom of the chamber.

5. A baling-press comprising a reciprocating plunger, and a baling-chamber provided with a bottom a portion of which is stationary and portion adapted to reciprocate with the plunger.

6. A baling-press comprising a baling-chamber, and a plunger adapted to reciprocate therein and carrying a transverse section of the bottom of the chamber.

7. A baling-press comprising a baling-chamber, supports projecting beneath the chamber, a plunger arranged to reciprocate within the chamber, having a transverse section of the bottom of the chamber secured thereto and carrying laterally mounted anti-friction rollers which are arranged to roll against the supports.

8. A baling-press comprising a baling-chamber, a plunger adapted to reciprocate within the chamber, and consisting of a base frame, a vertically arranged compression front secured thereto, and a movable section of the chamber bottom secured to the base frame and extending forwardly from the compression front and transversely approximately the width of the baling-chamber, said base frame and bottom being adapted to reciprocate beneath the bottom of said chamber.

9. A baling-press comprising a baling-chamber, a plunger having a vertical compression front and a base frame, a recess between it and the vertical compression front, said base frame also carrying a bottom which extends transversely approximately the width of the baling-chamber and is arranged to pass beneath the stationary part of said chamber.

10. A baling-press comprising a baling-chamber provided with a fixed bottom, a reciprocating plunger therein having a base frame supporting a bottom extending transversely approximately the width of the chamber and adapted to reciprocate with the plunger.

11. A baling-press comprising a baling-chamber, a plunger arranged to reciprocate within the chamber and carrying a section of the bottom of the chamber, and means to operate in conjunction with the plunger to neutralize the shock of the retracting movement of the plunger.

12. A baling-press comprising a baling-chamber provided with a bottom extending transversely the width of the chamber, a plunger arranged to reciprocate within the chamber, said plunger supporting a section of the bottom of the chamber and carrying a pneumatic means to counteract the shock incident to the retracting movement of the plunger.

13. A baling-press comprising a baling-chamber, a reciprocating plunger within the chamber and carrying a section of the bottom of the chamber, pneumatic means carried by the plunger, and means arranged to co-act with said pneumatic means to receive the shock as the plunger is retracted.

14. A baling-press comprising a baling-chamber, a reciprocating plunger within the chamber, a tucker pivotally secured at a point in front of and lower than its contact with the plunger or material being baled whereby its lower edge will be carried upwardly and forwardly in a circle about its pivots permitting the plunger and material to pass beneath it, and a torsion spring to force the tucker rearwardly and downwardly to its normal position when the plunger is retracted.

15. A baling-press comprising a baling-chamber, a reciprocating plunger within the chamber, a tucker pivotally secured at a point in front of and lower than its contact with the plunger or material being baled whereby its lower edge will be carried upwardly and forwardly in a circle about its pivots permitting the plunger and material to pass beneath it, a torsion spring opposing the tucker in its upward and forward movement and adapted to restore the same to its normal position when the plunger is retracted, and means to regulate the tension of said spring.

16. A baling-press comprising a baling-chamber, a reciprocating plunger within the chamber, a tucker pivotally secured at a point in front of and lower than its contact with the plunger or material being baled whereby its lower edge will be carried upwardly and forwardly in a circle about its pivots permitting the plunger and material to pass beneath it, and means to force said tucker rearwardly and downwardly to its normal position when the plunger is retracted.

17. In a baling-press having a baling-chamber, a reciprocating plunger within the chamber, and a tucker comprising a pivot, a bracket movably supported on the pivot and carrying a transversely arranged blade, and adjustable means on the pivot to oppose the rotation of the bracket on the pivot.

18. In a baling-press having a baling-chamber, a reciprocating plunger within the chamber, and a tucker comprising a pivot secured at a point in front of and lower than the contact of the tucker with the plunger or material being baled, a bracket movably supported on the pivot and carrying a transversely arranged blade, a housing on the pivot, and a torsion spring connected to the housing and the bracket.

19. In a baling-press having a baling-chamber, a reciprocating plunger within the chamber, and a tucker comprising a pivot, a bracket movably supported on the pivot and carrying a transversely arranged blade, a housing on the pivot, a torsion spring connected to the housing and the bracket and means to adjust the tension of the spring.

20. In a baling-press having a baling-chamber, a reciprocating plunger within the chamber, and a tucker comprising a pivot, a bracket movably supported on the pivot and carrying a transversely arranged blade, said pivot being secured at a point in front of and lower than the blade of the tucker so that the contact of the plunger or material between it and the tucker will cause the latter to move upwardly and forwardly out of the way of the plunger, and means on the pivot to oppose the rotation of the bracket on the pivot.

21. A baling-press comprising a baling-chamber, a power mechanism, a feeder adapted to force material into the chamber, and a pivoted member placed between said power and feeder and made of a plurality of parts and arranged whereby the position of the feeder may be adjusted.

22. A baling-press comprising a baling-chamber, a power mechanism, a feeder adapted to force material into the chamber, a pivoted member connected with the feeder, means beneath the chamber forming a connection between the power mechanism and said member and arranged to transmit motion from the former to the latter whereby the feeder is lowered and raised, and adjustable means whereby the position of the feeder may be regulated.

23. A baling-press comprising a baling-chamber, a power mechanism, a feeder adapted to force material into the chamber, a pivoted member connected with the feeder, means beneath the chamber arranged to form an operating connection between the power mechanism and member whereby the feeder is lowered and raised, and a safety device arranged to relieve the stress when the feeder is under abnormal strain.

24. A baling-press comprising a baling-chamber, a power mechanism, a feeder adapted to force material into the chamber, a pivoted member connected with the feeder, means extending from the power mechanism beneath the chamber and suitably connected with said member whereby the feeder is lowered and raised by the action of the power, and a safety device interposed between the power mechanism and feeder to relieve the strain when the feeder meets abnormal resistance.

25. A baling-press comprising a baling-chamber, a feeder adapted to force material into the chamber, a segment gear pivotally secured and connected with the feeder, and means to rock said gear whereby the feeder is lowered and raised.

26. A baling-press comprising a baling-chamber, a feeder adapted to force material into the chamber, a segment gear pivotally secured and connected with the feeder, and a rack arranged to reciprocate below the chamber and adapted to rock said gear whereby the feeder is lowered and raised.

27. A baling-press comprising a baling-chamber, a plunger having a base frame adapted to reciprocate beneath the chamber, a feeder adapted to force material into the chamber, a segment gear pivotally secured and connected with the feeder, a rack carried by said base frame and adapted to rock said gear whereby the feeder is lowered and raised.

28. A baling-press comprising a baling-chamber, a feeder adapted to force material into the chamber, a sheave pivotally secured and connected with the feeder, and means adapted to actuate said sheave whereby the feeder is lowered and raised.

29. A baling-press comprisng a baling-case and chamber, a power mechanism, a reciprocating plunger, a reciprocating part beneath the chamber adapted to form an operating connection between the power mechanism and plunger, a feeder shaft, a feeder secured to said shaft and adapted to force material into the chamber, a member also secured to the feeder shaft, a pivoted member connected with said reciprocating part to be actuated thereby, and means alongside the baling-case adapted to form an operative connection between said members whereby the feeder is lowered and raised.

30. A baling-press comprising a baling-case and chamber, a power transmitting mechanism, a plunger arranged to move toward said mechanism while pressing the charge, a feeder shaft, a feeder carried by said shaft and adapted to force material into the chamber, a member secured to the feeder shaft and having an actuating connection with the feeder, a pivoted member, means alongside the baling-case adapted to form an operative connection between said members, and means connecting the power transmitting mechanism with the pivoted member whereby the feeder is lowered as the plunger moves from said mechanism and raised as the plunger advances toward the same.

31. A baling-press comprising a baling-case and chamber, a power mechanism, a reciprocating plunger, a reciprocating part beneath the chamber arranged to form an operating connection between the power mechanism and plunger, a feeder adapted to force material into the chamber, a pivoted member connected with the feeder, and means at the side of the baling-case connected with said reciprocating part to be actuated thereby and having an actuating connection with said member whereby the feeder is lowered and raised.

32. A baling-press comprising a baling-case and chamber, a power mechanism, a reciprocating part beneath the chamber arranged to be actuated by the power mechanism, a feeder adapted to force material into the chamber, a pivoted member connected with the feeder, and means at the side of the baling-case connected with said reciprocating part to be actuated thereby and having an actuating connection with said member whereby the feeder is lowered and raised.

33. A baling-press comprising a baling-case and chamber, a power mechanism, means beneath the chamber arranged to be actuated by said mechanism, a feeder adapted to force material into the chamber, a pivoted member connected with the feeder, and means forming a connection outside the chamber with the means beneath the chamber and said member whereby the feeder is lowered and raised.

34. A baling-press comprising a baling-case and chamber, a power mechanism, means beneath the chamber arranged to be operated by the power mechanism, a feeder adapted to force material into the chamber, a member connected with the feeder, a pivoted member at the side of the baling-case and connected with the means beneath the chamber to be actuated thereby, and means forming an operative connection between the two members whereby the feeder is lowered and raised.

35. A baling-press comprising a baling-case and chamber, a power mechanism, a reciprocating plunger, a reciprocating part beneath the chamber arranged to form an operating connection between the power mechanism and plunger, a feeder adapted to force material into the chamber, a member carried by the feeder shaft and connected with the feeder, a pivoted member at the side of the baling-case connected with said reciprocating part to be actuated thereby, and an operative connection between the two members whereby the feeder is lowered and raised.

36. A baling-press comprising a baling-chamber, a power transmitting mechanism, a plunger arranged to move toward said mechanism while pressing the charge, a feeder adapted to force material into the chamber, a member carried by the feeder shaft and connected with the feeder, a pivoted member at the side of the baling-case and connected with the other member, and means connecting the power transmitting mechanism with the pivoted member whereby the feeder is lowered as the plunger nears position farthest from said mechanism and raised when the plunger advances toward the same.

37. A baling-press comprising a baling-case and chamber, a power transmitting mechanism, a plunger arranged to move toward said mechanism while pressing the charge, a feeder adapted to force material into the chamber, a pivoted member at the side of the baling-case and connected with the feeder, and means connecting the power transmitting mechanism with said member whereby the feeder is lowered as the plunger is moved from said mechanism and raised as the plunger advances toward the same.

MOSES C. NIXON.

Witnesses:
M. E. Cowell,
George H. Braddock.

Copies of this patent may be obtained for five cents each, by addressing the "Commissioner of Patents, Washington, D. C."